(12) United States Patent
Diessner et al.

(10) Patent No.: US 10,936,884 B2
(45) Date of Patent: Mar. 2, 2021

(54) VEHICLE VISION SYSTEM WITH OBJECT DETECTION FAILSAFE

(71) Applicant: MAGNA ELECTRONICS INC., Auburn Hills, MI (US)

(72) Inventors: Horst D. Diessner, Rochester Hills, MI (US); Richard C. Bozich, Canton, MI (US); Aleksandar Stefanovic, Mississauga (CA); Anant Kumar Lall, Troy, MI (US); Nikhil Gupta, Brampton (CA)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 276 days.

(21) Appl. No.: 15/876,235

(22) Filed: Jan. 22, 2018

(65) Prior Publication Data

US 2018/0211118 A1 Jul. 26, 2018

Related U.S. Application Data

(60) Provisional application No. 62/449,224, filed on Jan. 23, 2017.

(51) Int. Cl.
*G06K 9/00* (2006.01)
*G08G 1/16* (2006.01)
*H04N 5/14* (2006.01)

(52) U.S. Cl.
CPC ..... *G06K 9/00805* (2013.01); *G06K 9/00791* (2013.01); *G08G 1/16* (2013.01); *G08G 1/166* (2013.01); *G08G 1/167* (2013.01); *H04N 5/14* (2013.01); *B60R 2300/402* (2013.01); *G06T 2207/30244* (2013.01); *G06T 2207/30261* (2013.01)

(58) Field of Classification Search
CPC .......... G06K 9/00805; G06K 9/00791; G08G 1/166; G08G 1/167; G08G 1/16; H04N 5/14; B60R 2300/402; G06T 2207/30244; G06T 2207/30261
See application file for complete search history.

(56) References Cited

U.S. PATENT DOCUMENTS

| 5,550,677 | A | 8/1996 | Schofield et al. |
| 5,670,935 | A | 9/1997 | Schofield et al. |
| 5,796,094 | A | 8/1998 | Schofield et al. |

(Continued)

FOREIGN PATENT DOCUMENTS

JP 2007038773 A * 2/2007

*Primary Examiner* — Shaghayegh Azima
(74) *Attorney, Agent, or Firm* — Honigman LLP

(57) ABSTRACT

A vision system for a vehicle includes a camera configured to be disposed at a vehicle so as to have a field of view exterior of the vehicle. A processor is operable to process image data captured by the camera. The vision system determines conditions where processing of captured image data degrades in performance due to environmental conditions. The vision system, responsive to a determined condition, determines a safe state for image processing of captured image data for that determined condition. A failsafe algorithm, responsive to processing of image data captured by the camera and responsive to the determined condition, and in accordance with the determined safe state for that determined condition, determines true negatives and avoids false positives and false negatives.

20 Claims, 13 Drawing Sheets

(56) References Cited

U.S. PATENT DOCUMENTS

| | | |
|---|---|---|
| 5,949,331 A | 9/1999 | Schofield et al. |
| 6,690,268 B2 | 2/2004 | Schofield et al. |
| 7,004,593 B2 | 2/2006 | Weller et al. |
| 7,038,577 B2 | 5/2006 | Pawlicki et al. |
| 7,167,796 B2 | 1/2007 | Taylor et al. |
| 7,526,103 B2 | 4/2009 | Schofield et al. |
| 7,720,580 B2 | 5/2010 | Higgins-Luthman |
| 7,855,755 B2 | 12/2010 | Weller et al. |
| 9,183,447 B1* | 11/2015 | Gdalyahu ............ G06K 9/3241 |
| 10,071,687 B2 | 9/2018 | Ihlenburg et al. |
| 2004/0212686 A1* | 10/2004 | Usami ................ H04N 5/23274 348/208.99 |
| 2005/0152581 A1 | 7/2005 | Hoki et al. |
| 2007/0003154 A1* | 1/2007 | Sun ........................... G06T 7/11 382/254 |
| 2007/0221822 A1 | 9/2007 | Stein et al. |
| 2007/0253597 A1 | 11/2007 | Utida et al. |
| 2008/0043099 A1 | 2/2008 | Stein et al. |
| 2008/0219505 A1* | 9/2008 | Morimitsu ......... G06K 9/00798 382/103 |
| 2011/0109476 A1* | 5/2011 | Porikli ................ G06K 9/3241 340/905 |
| 2012/0062743 A1* | 3/2012 | Lynam ......... H04N 5/23293 348/148 |
| 2012/0249789 A1* | 10/2012 | Satoh ................ G06K 9/00832 348/143 |
| 2013/0016877 A1* | 1/2013 | Feris ................ G06K 9/00771 382/103 |
| 2013/0169155 A1* | 7/2013 | Nakashima ............. B60Q 1/14 315/82 |
| 2013/0231830 A1* | 9/2013 | Van Dan Elzen .... B60W 10/04 701/42 |
| 2013/0242188 A1* | 9/2013 | Tripathi ................. H04N 11/20 348/453 |
| 2014/0218529 A1* | 8/2014 | Mahmoud .......... H04N 5/23245 348/148 |
| 2014/0232869 A1* | 8/2014 | May ........................ G06T 7/70 348/148 |
| 2014/0241589 A1* | 8/2014 | Weber ..................... G06T 5/004 382/108 |
| 2014/0324266 A1* | 10/2014 | Zhu ........................ G01W 1/00 701/23 |
| 2014/0347486 A1* | 11/2014 | Okouneva .............. H04N 5/247 348/148 |
| 2014/0350834 A1* | 11/2014 | Turk ........................ B60R 1/00 701/300 |
| 2015/0307024 A1* | 10/2015 | Fukuda ................... G06T 11/60 382/103 |
| 2016/0137126 A1 | 5/2016 | Fursich et al. |
| 2016/0284076 A1* | 9/2016 | Voros ................... H04N 17/002 |
| 2016/0297365 A1 | 10/2016 | Nix |
| 2016/0342850 A1* | 11/2016 | Elimalech ............... G08G 1/167 |
| 2017/0023945 A1* | 1/2017 | Cavalcanti ........... G08G 1/0141 |
| 2017/0104986 A1* | 4/2017 | Zhang .................... G03B 43/00 |
| 2017/0169301 A1 | 6/2017 | Kunze |
| 2017/0270381 A1* | 9/2017 | Itoh ....................... B60S 1/0844 |
| 2018/0058127 A1* | 3/2018 | Ikeda .................... E05F 15/689 |
| 2018/0134217 A1 | 5/2018 | Peterson et al. |
| 2018/0151066 A1* | 5/2018 | Oba .................... G01C 21/3407 |
| 2018/0315167 A1* | 11/2018 | Akiyama ........... G06K 9/00791 |
| 2018/0357484 A1* | 12/2018 | Omata ............... G06K 9/00818 |

* cited by examiner

| System Behavior -><br>Ground Truth ↓ | Feature detects ... | Feature does not detect |
|---|---|---|
| Condition present | True Positive<br><br>Failure Condition present<br><br>Feature detects correct condition | False Negative<br><br>Failure Condition Present<br><br>Feature fails to detect condition |
| Condition absent | False Positive<br><br>Failure Condition is absent<br><br>Feature detects wrong condition | True Negative<br><br>Failure Condition is absent<br><br>Feature does not detect condition |

FIG. 4

| System Behavior -><br>Ground Truth ↓ | Feature detects ... | Feature does not detect |
|---|---|---|
| OOC present | True Positive<br><br>1 or more extrinsic angles deviate more than<br>ke_FS_deg_ExtrinsicAngleTolerance<br><br>Feature detects OOC condition | False Negative<br><br>1 or more extrinsic angles deviate more than<br>ke_FS_deg_ExtrinsicAngleTolerance<br><br>Feature fails to detect OOC condition |
| OOC absent | False Positive<br><br>All extrinsic angles deviate less than<br>ke_FS_deg_ExtrinsicAngleTolerance<br><br>Feature detects OOC condition | True Negative<br><br>All extrinsic angles deviate less than<br>ke_FS_deg_ExtrinsicAngleTolerance<br><br>Feature does not detect OOC condition |

FIG. 7

| | | Use Cases | | | | |
|---|---|---|---|---|---|---|
| | | 1 | 2 | 3 | 4 | |
| | | Static | Moving low speed (<10 km/h) forward | Moving high speed (10 ...50 km/h) forward | Moving low speed (<10 km/h) backwards | |
| Failsafe Condition | Details | | | | | |
| Blockage | Solid Dirt, <25% of image | 1 | 1 | 1 | 1 | |
| | Solid Dirt, 25% ... 50% of image | 1 | 1 | 1 | 1 | |
| | Solid Dirt, 50% ... 75% of image | 1 | 1 | 1 | 1 | |
| | Solid Dirt, >75% of image | 1 | 1 | 1 | 1 | |
| Transparent Blockage | Scratched surface in camera lens, area > 10% of image | 1 | 1 | | 1 | TO FIG. 5A-2 |
| | Single deep scratch across camera lens | 1 | 1 | | 1 | |
| | Salt film, <25% of image | 1 | 1 | 1 | 1 | |
| | Salt film, 25% ... 50% of image | 1 | 1 | | 1 | |
| | Salt film, 50% ... 75% of image | 1 | 1 | 1 | 1 | |
| | Salt film, >75% of image | 1 | 1 | | 1 | |
| | Dirt film, <25% of image | 1 | 1 | 1 | 1 | |
| | Dirt film, 25% ... 50% of image | 1 | 1 | | 1 | |
| | Dirt film, 50% ... 75% of image | 1 | 1 | 1 | 1 | |
| | Dirt film, >75% of image | 1 | 1 | 1 | 1 | |
| | Frost | 1 | 1 | 1 | 1 | |
| | Ice | 1 | 1 | 1 | 1 | |

FIG. 5A-1

| 5 | | Lighting Conditions | | | | | | |
|---|---|---|---|---|---|---|---|---|
| Moving high speed (10...50 km/h) backwards | Number of Use Cases | Bright light (>100K Lux) | Medium light (15K to 20K Lux) | Low light (30 minutes after sunset) | Night - w/o brake lights and external lights | Night - external light: gas stations, billboards, street light, etc. | Illumination from behind object | Cloudy w/o precipitation |
| 1 | 5 | 1 | 1 | 1 | 1 | 1 | 1 | 1 |
| 1 | 5 | 1 | 1 | 1 | 1 | 1 | 1 | 1 |
| 1 | 5 | 1 | 1 | 1 | 1 | 1 | 1 | 1 |
| 1 | 5 | 1 | 1 | 1 | 1 | 1 | 1 | 1 |
|   | 3 | 1 | 1 | 1 | 1 | 1 | 1 | 1 |
|   | 3 | 1 | 1 | 1 | 1 | 1 | 1 | 1 |
| 1 | 5 | 1 | 1 | 1 | 1 | 1 | 1 | 1 |
|   | 3 | 1 | 1 | 1 | 1 | 1 | 1 | 1 |
|   | 4 | 1 | 1 | 1 | 1 | 1 | 1 | 1 |
|   | 4 | 1 | 1 | 1 | 1 | 1 | 1 | 1 |
| 1 | 5 | 1 | 1 | 1 | 1 | 1 | 1 | 1 |
|   | 3 | 1 | 1 | 1 | 1 | 1 | 1 | 1 |
|   | 4 | 1 | 1 | 1 | 1 | 1 | 1 | 1 |
|   | 4 | 1 | 1 | 1 | 1 | 1 | 1 | 1 |
| 1 | 5 | 1 | 1 | 1 | 1 | 1 | 1 | 1 |
| 1 | 5 | 1 | 1 | 1 | 1 | 1 | 1 | 1 |

FIG. 5A-2

| External Conditions | | | | | | | Number of Conditions | Number of Videos (Use Cases x Conditions) |
|---|---|---|---|---|---|---|---|---|
| while Raining | while Snowing | Fog | Vehicle Exhaust | Sun and Building Shadow | Tree Shadows | Vehicle Shadow | | |
| 1 | 1 |   |   |   |   |   | 8 | 40 |
| 1 | 1 | 1 | 1 | 1 | 1 | 1 | 13 | 65 |
| 1 | 1 |   |   |   |   |   | 8 | 40 |
| 1 | 1 | 1 | 1 | 1 | 1 | 1 | 13 | 65 |
| 1 | 1 | 1 | 1 | 1 | 1 | 1 | 13 | 39 |
| 1 | 1 | 1 | 1 | 1 | 1 | 1 | 13 | 39 |
| 1 | 1 |   |   |   |   |   | 8 | 40 |
| 1 | 1 | 1 | 1 | 1 | 1 | 1 | 13 | 39 |
| 1 | 1 |   |   |   |   |   | 8 | 32 |
| 1 | 1 | 1 | 1 | 1 | 1 | 1 | 13 | 52 |
| 1 | 1 |   |   |   |   |   | 8 | 40 |
| 1 | 1 | 1 | 1 | 1 | 1 | 1 | 13 | 39 |
| 1 | 1 |   |   |   |   |   | 8 | 32 |
| 1 | 1 | 1 | 1 | 1 | 1 | 1 | 13 | 52 |
| 1 | 1 | 1 | 1 | 1 | 1 | 1 | 13 | 65 |
| 1 | 1 | 1 | 1 | 1 | 1 | 1 | 13 | 65 |

FIG. 5A-3

| | | Use Cases | | | | |
|---|---|---|---|---|---|---|
| | | 1 | 2 | 3 | 4 | |
| | | Static | Moving low speed (<10 km/h) forward | Moving high speed (10...50 km/h) forward | Moving low speed (<10 km/h) backwards | |
| Failsafe Condition | Details | | | | | |
| Water Drop | 1 water drop | 1 | 1 | | 1 | |
| | 2 water drops | 1 | 1 | | 1 | |
| | several small droplets (*) | 1 | 1 | | 1 | |
| | Condensation (*) | 1 | 1 | | 1 | |
| | Mist (*) | 1 | 1 | | 1 | |
| Low Light | Ke_FS_lux_Minillumination | 1 | 1 | 1 | 1 | |
| | Ke_FS_lux_Minillumination/2 | 1 | 1 | | 1 | TO FIG. 5B-2 |
| | Ke_FS_lux_Minillumination/4 | 1 | | | | |
| Shadow | Vehicle Shadow, 0 degrees | 1 | 1 | 1 | 1 | |
| | Vehicle Shadow, -45 degrees | 1 | 1 | 1 | 1 | |
| | Vehicle Shadow, 45 degrees | 1 | 1 | 1 | 1 | |
| Highlight / Glare | Ke_FS_lux_Maxillumination | 1 | 1 | | 1 | |
| | 1.1*Ke_FS_lux_Maxillumination | 1 | 1 | | 1 | |
| | 1.2*Ke_FS_lux_Maxillumination | 1 | 1 | | 1 | |
| | 1.3*Ke_FS_lux_Maxillumination | 1 | 1 | | 1 | |
| | Spot light in camera image | 1 | 1 | | 1 | |
| | Sun reflection on asphalt | 1 | 1 | | 1 | |
| | Sun reflection on water | 1 | 1 | | 1 | |
| | Sun reflection on another vehicle | 1 | 1 | | 1 | |
| | Sun reflection on building window | 1 | 1 | | 1 | |
| Sun Condition | Sun partially visible in image | 1 | 1 | 1 | 1 | |
| | Sun entirely visible in image | 1 | 1 | 1 | 1 | |
| TOTAL | | | | | | |

FIG. 5B-1

| Moving high speed (10...50 km/h) backwards | Number of Use Cases | Lighting Conditions | | | | | | |
|---|---|---|---|---|---|---|---|---|
| 5 | | Bright light (>100K Lux) | Medium light (15K to 20K Lux) | Low light (30 minutes after sunset) | Night - w/o brake lights and external lights | Night - external light: gas stations, billboards, street light, etc. | Illumination from behind object | Cloudy w/o precipitation |
| | 3 | 1 | 1 | 1 | | 1 | 1 | 1 |
| | 3 | 1 | 1 | 1 | | 1 | 1 | 1 |
| | 3 | 1 | 1 | 1 | | 1 | 1 | 1 |
| | 3 | 1 | 1 | 1 | | 1 | 1 | 1 |
| | 3 | 1 | 1 | 1 | | 1 | 1 | 1 |
| 1 | 5 | | | | 1 | 1 | | |
| | 3 | | | | 1 | 1 | | |
| | 1 | | | | 1 | 1 | | |
| 1 | 5 | 1 | 1 | | | | | |
| 1 | 5 | 1 | 1 | | | | | |
| 1 | 5 | 1 | 1 | | | | | |
| | 3 | 1 | | | | | | |
| | 3 | 1 | | | | | | |
| | 3 | 1 | | | | | | |
| | 3 | 1 | | | | | | |
| | 3 | | 1 | 1 | | | 1 | 1 |
| | 3 | 1 | | | | | | |
| | 3 | 1 | 1 | | | | | |
| | 3 | 1 | 1 | | | | | |
| | 3 | 1 | 1 | | | | | |
| 1 | 5 | 1 | 1 | | | | | |
| 1 | 5 | 1 | 1 | | | | | |

FROM FIG. 5B-1

| External Conditions | | | | | | | | |
|---|---|---|---|---|---|---|---|---|
| while Raining | while Snowing | Fog | Vehicle Exhaust | Sun and Building Shadow | Tree Shadows | Vehicle Shadow | Number of Conditions | Number of Videos (Use Cases x Conditions) |
| 1 | 1 | 1 | 1 | 1 | 1 | 1 | 13 | 39 |
| 1 | 1 | 1 | 1 | 1 | 1 | 1 | 13 | 39 |
| 1 | 1 | 1 | 1 | 1 | 1 | 1 | 13 | 39 |
| 1 | 1 | 1 | 1 | 1 | 1 | 1 | 13 | 39 |
| 1 | 1 | 1 | 1 | 1 | 1 | 1 | 13 | 39 |
| 1 | | | 1 | | | | 4 | 20 |
| 1 | | | 1 | | | | 4 | 12 |
| 1 | | | 1 | | | | 4 | 4 |
| | | | | 1 | 1 | 1 | 5 | 25 |
| | | | | 1 | 1 | 1 | 5 | 25 |
| | | | | 1 | 1 | 1 | 5 | 25 |
| | | | | 1 | 1 | | 3 | 9 |
| | | | | 1 | 1 | | 3 | 9 |
| | | | | 1 | 1 | | 3 | 9 |
| | | | | 1 | 1 | | 3 | 9 |
| 1 | | | | 1 | 1 | 1 | 8 | 24 |
| | | | | | | | 1 | 3 |
| | | | | 1 | 1 | 1 | 5 | 15 |
| | | | | 1 | 1 | 1 | 5 | 15 |
| | | | | 1 | 1 | 1 | 5 | 15 |
| | | | | 1 | 1 | 1 | 5 | 25 |
| | | | | 1 | 1 | 1 | 5 | 25 |
| | | | | | | | | 1208 |

FIG. 5B-3

|  |  | Use Cases | | | |
|---|---|---|---|---|---|
|  |  | 1 | 2 | 3 | 4 |
|  |  | Static | Moving low speed (<10 km/h) forward | Moving high speed (10...50 km/h) forward | Moving low speed (<10 km/h) backwards |
| Out of focus | Ke_FS_MTF_MinFocus | 1 | 1 |  | 1 |
|  | 0.8*Ke_FS_MTF_MinFocus | 1 | 1 |  | 1 |
|  | 0.6*Ke_FS_MTF_MinFocus | 1 | 1 |  | 1 |
| Out of calibration | camera height = 800mm | 1 |  | 1 | 1 |
|  | camera height = 1000mm | 1 |  | 1 | 1 |
|  | camera height = 1200mm | 1 |  | 1 | 1 |
| Imager damaged | 25% of pixels of a 50 pixel region damaged | 1 | 1 |  |  |
|  | 75% of pixels of a 50 pixel region damaged | 1 | 1 |  |  |
|  | 25% of pixels of a 200 pixel region damaged | 1 | 1 |  |  |
|  | 75% of pixels of a 200 pixel region damaged | 1 | 1 |  |  |
|  | 25% of pixels of a 500 pixel region damaged | 1 | 1 |  |  |
|  | 75% of pixels of a 500 pixel region damaged | 1 | 1 |  |  |
|  | 25% of pixels of a 1000 pixel region damaged | 1 | 1 |  |  |
|  | 75% of pixels of a 1000 pixel region damaged | 1 | 1 |  |  |
|  | all imager pixels damaged | 1 | 1 |  |  |
| TOTAL |  |  |  |  |  |

| | 5 | | Lighting Conditions | | | | | | |
|---|---|---|---|---|---|---|---|---|---|
| | Moving high speed (10...50 km/h) backwards | Number of Use Cases | Bright light (>100K Lux) | Medium light (15K to 20K Lux) | Low light (30 minutes after sunset) | Night - w/o brake lights and external lights | Night - external light: gas stations, billboards, street light, etc. | Illumin-ation from behind object | Cloudy w/o perci-pitation |
| | | 3 | 1 | 1 | 1 | 1 | 1 | 1 | 1 |
| | | 3 | 1 | 1 | 1 | 1 | 1 | 1 | 1 |
| | | 3 | 1 | 1 | 1 | 1 | 1 | 1 | 1 |
| | | 3 | 1 | 1 | 1 | 1 | 1 | 1 | 1 |
| FROM FIG. 6-1 | | 3 | 1 | 1 | 1 | 1 | 1 | 1 | 1 | TO FIG. 6-3
| | | 3 | 1 | 1 | 1 | 1 | 1 | 1 | 1 |
| | 1 | 3 | 1 | 1 | 1 | 1 | 1 | 1 | 1 |
| | 1 | 3 | 1 | 1 | 1 | 1 | 1 | 1 | 1 |
| | 1 | 3 | 1 | 1 | 1 | 1 | 1 | 1 | 1 |
| | 1 | 3 | 1 | 1 | 1 | 1 | 1 | 1 | 1 |
| | 1 | 3 | 1 | 1 | 1 | 1 | 1 | 1 | 1 |
| | 1 | 3 | 1 | 1 | 1 | 1 | 1 | 1 | 1 |
| | 1 | 3 | 1 | 1 | 1 | 1 | 1 | 1 | 1 |
| | 1 | 3 | 1 | 1 | 1 | 1 | 1 | 1 | 1 |
| | 1 | 3 | 1 | 1 | 1 | 1 | 1 | 1 | 1 |

FIG. 6-2

| External Conditions | | | | | | | Number of Conditions | Number of Videos (Use Cases x Conditions) |
|---|---|---|---|---|---|---|---|---|
| while Raining | while Snowing | Fog | Vehicle Exhaust | Sun and Building Shadow | Tree Shadows | Vehicle Shadow | | |
| 1 | 1 | 1 | 1 | 1 | 1 | 1 | 14 | 42 |
| 1 | 1 | 1 | 1 | 1 | 1 | 1 | 14 | 42 |
| 1 | 1 | 1 | 1 | 1 | 1 | 1 | 14 | 42 |
| 1 | 1 | 1 | 1 | 1 | 1 | 1 | 14 | 42 |
| 1 | 1 | 1 | 1 | 1 | 1 | 1 | 14 | 42 |
| 1 | 1 | 1 | 1 | 1 | 1 | 1 | 14 | 42 |
| 1 | 1 | 1 | 1 | 1 | 1 | 1 | 14 | 42 |
| 1 | 1 | 1 | 1 | 1 | 1 | 1 | 14 | 42 |
| 1 | 1 | 1 | 1 | 1 | 1 | 1 | 14 | 42 |
| 1 | 1 | 1 | 1 | 1 | 1 | 1 | 14 | 42 |
| 1 | 1 | 1 | 1 | 1 | 1 | 1 | 14 | 42 |
| 1 | 1 | 1 | 1 | 1 | 1 | 1 | 14 | 42 |
| 1 | 1 | 1 | 1 | 1 | 1 | 1 | 14 | 42 |
| 1 | 1 | 1 | 1 | 1 | 1 | 1 | 14 | 42 |
| 1 | 1 | 1 | 1 | 1 | 1 | 1 | 14 | 42 |
| | | | | | | | | 630 |

FROM FIG. 6-2

FIG. 6-3

VEHICLE VISION SYSTEM WITH OBJECT DETECTION FAILSAFE

CROSS REFERENCE TO RELATED APPLICATION

The present application claims the filing benefits of U.S. provisional application Ser. No. 62/449,224, filed Jan. 23, 2017, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras (preferably one or more CMOS cameras) to capture image data representative of images exterior of the vehicle, and provides a failsafe algorithm operable to determine true positives and true negatives and avoid false positives and false negatives.

These and other objects, advantages, purposes and features of the present invention will become apparent upon review of the following specification in conjunction with the drawings.

BRIEF DESCRIPTION OF THE DRAWINGS

FIG. 4 is a confusion matrix used to define detection rates for the failsafe feature of the present invention;

FIGS. 5A-1 through 5B-3 show a table showing failsafe conditions and use cases, lighting conditions and external conditions, and showing test results for the conditions;

FIGS. 6-1 through 6-3 is a table showing failsafe conditions due to internal influences, and use cases, lighting conditions and external conditions, and showing test results for the conditions; and FIG. 7 is a confusion matrix used to generate detection rates for an out of calibration condition in accordance with the present invention.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
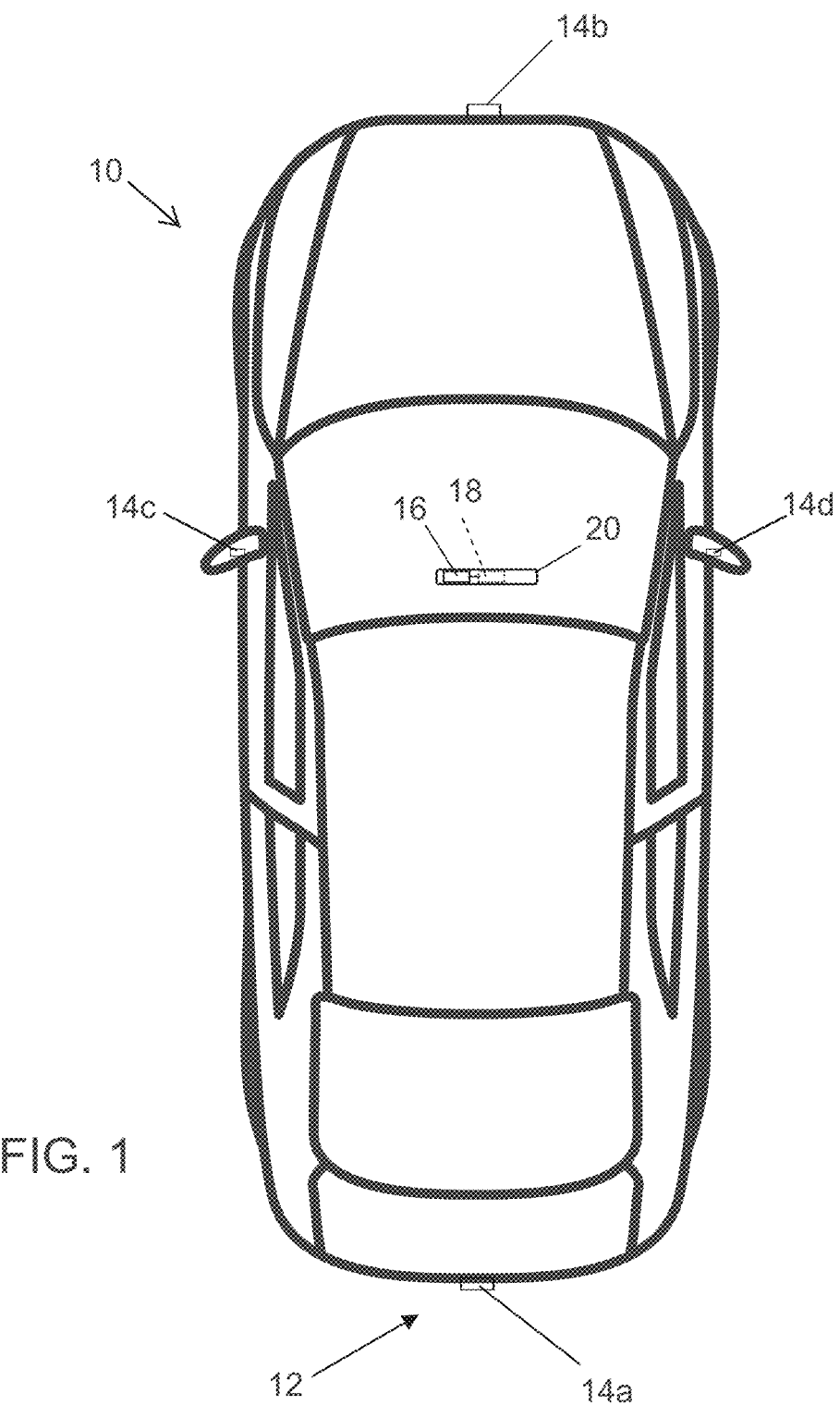
FIG. 1 is a plan view of a vehicle with a vision system that incorporates cameras in accordance with the present invention.
Figure 2:
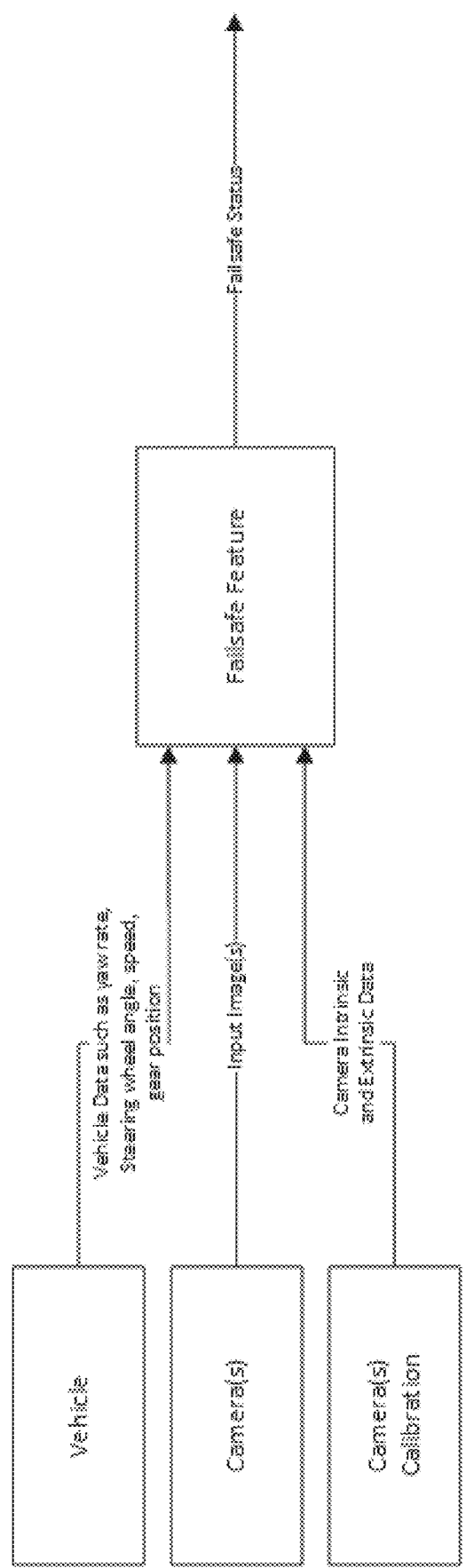
FIG. 2 is a context diagram of the failsafe feature and system of the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forward facing camera 14b at the front (or at the windshield) of the vehicle, and a sideward/rearward facing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The system of the present invention determines the conditions where machine vision may degrade in performance due to specific environmental conditions. Such determination is independent from hardware failures. The system determines inputs or parameters to define a safe state for machine vision quality to the user and/or safety implications, depending on the application requirements.

The failsafe feature should not experience degradation in the following conditions: when the vehicle is stationary, when the vehicle is moving, when there is snow on the ground, when there is a wet road surface, when it is raining, when there is a very bright scene, during daytime, during nighttime and at dusk. Depending on the conditions and the severity level of the failsafe, recommendations on when each vehicle function should be disabled to prevent incorrect operation is customizable. The decision is dependent on the application or usage of the outputs.

During operation, some conditions are considered when integrating the failsafe feature. These conditions may affect the feature performance, but may not be directly related to the feature. For example, no camera related detected trouble codes (DTCs) feature should be present while the failsafe feature is active. The ignition should be in the RUN position, and all doors, the tailgate and the trunk lid of the vehicle should be closed, and the camera badge (if applicable) is open, and the exterior rear view mirrors should be unfolded (if applicable). The ECU should be properly configured and variant coding should be successfully completed before the failsafe feature is active.

The pre-conditions are met in order to meet all functional and performance requirements. For example, the intrinsic parameters of cameras are calibrated and the input images utilized by the failsafe algorithm are uncompressed. There are no image quality pre-conditions that need to be met since it is the purpose of the failsafe feature to detect certain image conditions affecting machine vision performance negatively. The nominal camera position Ka_FS_I_CamPos of all cameras may be provided to the failsafe algorithm, and the intrinsic camera parameters Ka_FS_I_CamIntrinsic of all cameras may be provided to the failsafe algorithm. Optionally, and desirably, the images provided to the failsafe algorithm may have a minimum resolution of 1280×800 pixels, and the provided images may have a minimum frame rate of 30 fps, and the provided images may include color information. The images provided to the failsafe algorithm may comprise un-distorted fisheye-type raw images, and a camera lens model (lens distortion polynomials) may be provided. Also, details of the ISP (image signal processing) design may be provided to the failsafe algorithm. The failsafe feature may be fully functional in all lighting conditions. A purpose of the failsafe feature is to detect adverse lighting conditions.

The failsafe feature is applicable to a forward facing camera mounted at and behind the windshield of the vehicle or at the front grille or bumper of the vehicle. The failsafe feature is also or otherwise applicable to a rear facing camera mounted at a rear portion of the vehicle, such as at a trunk lid or tailgate of the vehicle. The failsafe feature is also or otherwise applicable to a left and/or right side camera mounted in the driver and/or passenger side rear view mirror of the vehicle.

The failsafe feature allows a variation of the vehicle roll and vehicle pitch angles by +/−Ke_FS_deg_ExtrinsicAngleTolerance, without causing degradation of the performance. The failsafe feature detects all failsafe conditions independent of vehicle motion and independent of motion or changes in the scene (camera image). The failsafe feature detects all failsafe conditions independent of the ground surface and/or weather conditions. The failsafe feature detects all failsafe conditions if the illumination measured on the ground plane a selected distance (such as, for example, 1 m) from the camera is greater than Ke_FS_lux_Illumination. The failsafe feature detects all failsafe conditions in the normal life camera feed. No special targets, maneuvers, conditions are required for the detection of the failsafe conditions.

The failsafe feature detects a "blockage condition" utilizing a variable M_FS_Blocked if the camera lens is blocked fully or partially by solid materials such as mud, dirt, and/or the like. The failsafe feature detects a "Transparent Blockage Condition" utilizing a variable M_FS_TransBlocked if the camera lens is covered fully or partially by transparent materials such as film causing a loss of contrast or focus or brightness in the camera image. The failsafe feature detects a "Water Drop Condition" utilizing a variable M_FS_WaterDrop if the camera lens is fully or partially covered by water drops or if condensation is present of the camera lens. In situations where the camera lens is covered by condensation, the failsafe feature may detect "transparent blockage conditions" alternately. The failsafe feature detects a "Low Light Condition" utilizing the variable M_FS_Lowlight if the illumination is equal to or less than Ke_FS_lux_MinIllumination measured on the ground plane around 1 m from the camera. In situations where the camera lens is covered by more than 95 percent by a solid material, the failsafe feature may detect low light condition rather than blockage condition.

The failsafe feature detects a "shadow condition" utilizing a variable M_FS_Shadow if the host vehicle casts a shadow onto the ground plane in an area with a radius of Ke_FS_I_ShadowDetectRadius from the camera and if the illumination measured on the ground plane about 1 m from the camera is greater than a threshold value (such as designated by Ke_FS_lux_ShadowDetectMinIllum). The failsafe feature detects a "highlight/glare condition" utilizing a variable M_FS_HighlightGlare if the illumination is greater than a threshold level, Ke_FS_lux_MaxIllumination, as measured on the ground plane about 1 m from the camera. The failsafe feature may also detect a "highlight/glare condition" utilizing a variable M_FS_HighlightGlare when lens flare is present in the image. The failsafe feature also detects a "highlight/glare condition" utilizing a variable M_FS_HighlightGlare when a sun ray is present in the image. The failsafe feature also detects "highlight/glare condition" utilizing a variable M_FS_HighlightGlare when the sun is reflected on a surface into the camera lens. The failsafe feature detects a "sun condition" utilizing a variable M_FS_Sun when the sun is partially or entirely visible in the camera image.

The failsafe feature detects an "out of focus condition" utilizing a variable M_FS_OOF when the camera focus is less than a threshold focus level, Ke_FS_MTF_MinFocus. The failsafe feature detects an "out of calibration condition" utilizing a variable M_FS_OOC if any of the actual extrinsic camera orientation angles differ more than a threshold level from a nominal or threshold amount (e.g., a difference of Ke_FS_deg_ExtrinsicAngleTolerance from Ka_FS_I_CamExtrinsic). The failsafe feature detect an "imager damaged condition" utilizing a variable M_FS_ImagerDamaged if, for example, more than 25 percent of the pixels in a region larger than 50 pixels are damaged.

In accordance with the failsafe algorithm of the present invention, blockage is determined within ten video frames based on the following levels per the accompanying description:

| Level | Description |
| --- | --- |
| 0 | Blockage is not present |
| 25 | Partial blockage of the image region is determined greater than 0%, but less than 25% |
| 50 | Partial blockage of the image region is determined greater than 25%, but less than 50% |
| 75 | Partial blockage of the image region is determined greater than 50%, but less than 100% |
| 100 | Full Blockage of the image region is determined |

Similarly, condensation and/or water on the lens surface is determined within ten video frames of the image display based on the following levels per the accompanying description:

| Level | Description |
|---|---|
| 0 | Condensation or water is not present |
| 25 | Partial transparent/thin coverage of condensation of the image region is determined greater than 0%, but less than 50% |
| 50 | Full transparent/thin coverage of the image region is determined to be greater than 50% |
| 75 | Partial non-transparent/thick coverage of condensation of the image region is determined greater than 0%, but less than 50% |
| 100 | Full non-transparent/thick coverage of the image region is determined |

Also, shadows cast by the host vehicle are determined within ten video frames of the image display based on the following levels per the accompanying description:

| Level | Description |
|---|---|
| 0 | Shadow is not present |
| 1-99 | Shadow is present in the image region. The percentage expresses the intensity of the shadow |
| 100 | Dark shadow is present in the image region. No features or textures can be seen in the shadow. |

Also, highlight and glare conditions are determined within ten video frames of the image display based on the following levels per the accompanying description. In case several conditions are present (for example illumination is greater than a threshold level (>Ke_FS_lux_MaxIllumination) and glare is visible in the image, the larger level shall be reported for each image region).

| Level | Description |
|---|---|
| 0 | Highlight/Glare is not present |
| 25 | Illumination is > Ke_FS_lux_MaxIllumination |
| 50-100 | Glare or lens flare is present in image region, percentage indicates intensity |

The presence of the sun shall be determined within ten video frames of the image display based on the following levels per the accompanying description:

| Level | Description |
|---|---|
| 0 | Sun is not present |
| 1 | Sun is present in image region, pixels are saturated |

An out of calibration (OOC) condition is determined within two minutes of operation of the image display based on the following levels per the accompanying description:

| Level | Description |
|---|---|
| 0 | Calibration is consistent with end of line (EOL) result |
| 1 | Calibration has drifted out of the capability of short term and long term capability (TBD) |

An out of focus (OOF) condition is also determined within two minutes of operation of the image display based on the following levels per the accompanying description:

| Level | Description |
|---|---|
| 0 | Focus is suitable for machine vision |
| 1 | Focus degradation |

An imager damaged condition is determined within two minutes of operation of the image display based on the following levels per the accompanying description:

| Level | Description |
|---|---|
| 0 | Imager is ok |
| 1 | Imager has damaged pixels in the image region |

With respect to non-functional requirements for the failsafe algorithm and system of the present invention, the levels of failsafe shall be defined as follows:

| Level | Description |
|---|---|
| 0 | Failsafe condition not present |
| 25 | Evidence of the failsafe condition is present |
| 50 | The failsafe condition is determined present and degradation is expected |
| 75 | The failsafe condition has matured to cause significant degradation |
| 100 | The failsafe condition has caused that image information to not be reliable |

Optionally, a Boolean shall be provided for out of calibration cases, out of focus cases, low light cases, sun present cases and/or imager damaged cases.

The failsafe feature updates the output at a frequency of 50 msec. The camera image is divided into KS_FS_cnt_NumOutRows and KS_FS_cnt_NumOutCols equally sized image regions. The Failsafe feature reports the output variables for each image region (see FIG. 3).

| Output Variables | Dest. | Data Type | Range | Bits | Unit | Default Value | Description |
|---|---|---|---|---|---|---|---|
| M_FS_OOF | XCP | bool | 0-1 | 1 | n/a | Not present ($0) | Out of Focus indication |
| M_FS_OOC | XCP | bool | 0-1 | 1 | n/a | Not present ($0) | Out of Calibration indication |
| M_FS_Blocked | XCP | UNM | 0-100 | 8 | % (pct) | Not present ($0) | Blockage indication |

-continued

| Output Variables | Dest. | Data Type | Range | Bits | Unit | Default Value | Description |
|---|---|---|---|---|---|---|---|
| M_FS_TransBlocked | XCP | UNM | 0-100 | 8 | % (pct) | Not present ($0) | Transparent Blockage indication |
| M_FS_WaterDrop | XCP | UNM | 0-100 | 8 | % (pct) | Not present ($0) | Water Drop indication |
| M_FS_LowLight | XCP | UNM | 0-1 | 1 | n/a | Not present ($0) | Low Light indication |
| M_FS_Shadow | XCP | UNM | 0-100 | 8 | % (pct) | Not present ($0) | Shadow indicator |
| M_FS_HighlightGlare | XCP | UNM | 0-100 | 8 | % (pct) | Not present($0) | Highlight/Glare indication |
| M_FS_Sun | XCP | UNM | 0-1 | 1 | n/a | Not present ($0) | Sun in image indication |
| M_FS_ImagerDamaged | XCP | UNM | 0-1 | 1 | n/a | Not present ($0) | Imager Damaged indication |

A filtering or hysteresis strategy is also implemented for optimal performance and consistent outputting of the failsafe conditions.

Performance requirements for the failsafe algorithm or system include the system's ability to determine true positives, true negatives, false positives and false negatives for various conditions. The confusion matrix of FIG. 4 is used to define detection rates. The True Positive (TP) Rate should be >=99 percent and is measured using the number of video frames where the failsafe feature detected the correct failsafe condition in the image region where the condition is present. The False Positive (FP) Rate is less than one occurrence per 500 minutes (0.02 occurrences/min). The FP rate is measured by counting individual occurrences of detected failsafe conditions while no failsafe condition was present in an image region. A FP occurrence is defined as any reporting of a value other than 'Not present' in any output variable in any image region. An occurrence may be as short as one video frame or one output variable update cycle. Different occurrences are separated by at least one video frame or one output variable update cycle where the failsafe feature reported 'Not present' for a particular failsafe condition.

With reference to FIGS. 5A-1 through 5B-3, the conditions shown are due to external influences. These conditions may occur with normal machine system product usage. The conditions are not related to failure modes within the machine vision system.

Figure 3:
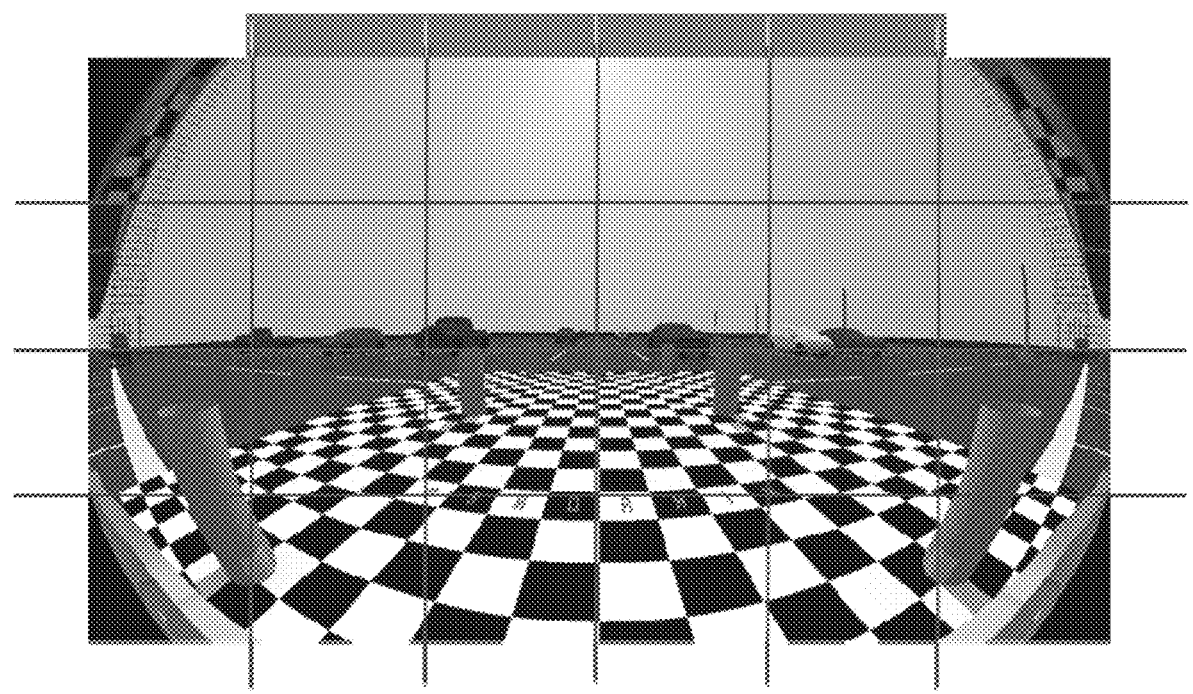
FIG. 3 is an image showing image regions of images derived from image data captured by a camera of the vehicle.

With reference to FIGS. 6-1 through 6-3, the conditions shown are due to internal influences. These conditions may occur with normal machine system product usage.

During testing of the system, the fail-safe feature algorithm may be applied to recorded videos. A design position (Ka_FS_I_CamExtrinsic) may be varied in order to simulate an out-of-calibration condition. The simulation may include positions where roll, pitch and yaw angles are randomly chosen in a range of +/−a given value (4*Ke_FS_deg_ExtrinsicAngleTolerance). The chosen individual randomized angles are normal distributed with a mean of zero. Each simulation run or combination of roll, pitch and yaw angle presents one data-point. The simulation may be completed when 1000 data-points were simulated where at least one of the extrinsic angles exceeds Ke_FS_deg_ExtrinsicAngleTolerance from the nominal design position (OOC condition present). The confusion matrix of FIG. 7 is used to generate the detection rates for the out-of-calibration condition.

For testing for false positive use cases, a minimum of 1000 videos with a minimum length of 1 minute may be recorded while no failsafe conditions are present. The videos for false positive testing are linearly distributed between the following conditions:
  Bright light (>100,000 lux)
  Medium light (15K to 50K Lux)
  Low light (30 minutes after sunset)
  Night—w/o brake lights and external lights
  Night—external light: gas stations, billboards, street light, etc.
  Illumination from behind object
  Cloudy w/o precipitation
  while Raining
  while Snowing
  Fog
  Vehicle Exhaust
  Sun and Building Shadow
  Tree Shadows
  Vehicle Shadow The videos for false positive testing are linearly distributed between the following road surface conditions and locations:
  Parking lots with lane markings (white, yellow, blue)
  Parking lots with cracks in the road surface material (asphalt, concrete)
  Parking lots and driveways with cracks
  Blacktop parking lots and driveways
  Gravel roads
  Gravel driveways with grass and weeds growing in gravel
  Sand
  Camp-grounds
  Dirt roads
  Boat ramps
  Near buildings
  with pedestrians in camera image
  with other vehicles in camera image
  white wall without texture
  back wall without texture
  colored wall without texture (red, green, etc.)

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Pat. No. 9,126,525, which are hereby incorporated herein by reference in their entireties.

Optionally, the camera may comprise a forward facing camera, such as disposed at a windshield electronics module (WEM) or the like. The forward facing camera may utilize aspects of the systems described in U.S. Pat. Nos. 8,256,821; 7,480,149; 6,824,281 and/or 6,690,268, and/or U.S. Publication Nos. US-2015-0327398; US-2015-0015713; US-2014-0160284; US-2014-0226012 and/or US-2009-0295181, which are all hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Optionally, the vision system (utilizing the forward facing camera and a rearward facing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system for a vehicle, said vision system comprising:
   a camera configured to be disposed at a vehicle so as to have a field of view interior or exterior of the vehicle, the camera comprising a lens and an imager;

an image processor operable to process image data captured by said camera;

wherein, with said camera disposed at the vehicle, said vision system determines conditions where image processing of captured image data is degraded in performance due to environmental conditions;

wherein said vision system determines conditions where image processing of captured image data is degraded in performance by determining, via image processing of captured image data, at least one selected from the group consisting of (i) a shadow present in the field of view of said camera within ten frames of captured image data and (ii) a damaged condition of said imager within two minutes of operation of said camera; and wherein said vision system, responsive to the determined condition where image processing of captured image data degrades in performance due to an environmental condition, determines a safe state for that determined condition.

2. The vision system of claim 1, wherein said camera comprises a forward-viewing camera having an exterior field of view forward of the vehicle.

3. The vision system of claim 1, wherein said camera comprises a rearward-viewing camera having an exterior field of view rearward of the vehicle.

4. The vision system of claim 1, wherein said camera comprises a sideward-viewing camera having an exterior field of view sideward of the vehicle.

5. The vision system of claim 1, wherein said camera comprises an interior monitoring camera having an interior field of view that encompasses a portion of an interior cabin of the vehicle.

6. The vision system of claim 1, wherein a failsafe algorithm, responsive to image processing by said image processor of image data captured by said camera and responsive to the determined condition, determines if the lens of said camera is at least partially blocked.

7. The vision system of claim 6, wherein the failsafe algorithm determines failsafe conditions via processing of image data captured by said camera.

8. The vision system of claim 7, wherein the failsafe algorithm determines failsafe conditions without use of special targets disposed in the field of view of said camera.

9. The vision system of claim 7, wherein the failsafe algorithm determines failsafe conditions without any special vehicle maneuvers of the vehicle.

10. The vision system of claim 1, wherein a failsafe algorithm, responsive to image processing by said image processor of image data captured by said camera and responsive to the determined condition, determines if said camera is out of focus.

11. The vision system of claim 1, wherein a failsafe algorithm, responsive to image processing by said image processor of image data captured by said camera and responsive to the determined condition, determines if said camera is out of calibration.

12. A vision system for a vehicle, said vision system comprising:

a camera configured to be disposed at a vehicle so as to have an exterior field of view forward of the vehicle, the camera comprising a lens and an imager;

an image processor operable to process image data captured by said camera;

wherein, with said camera disposed at the vehicle, said vision system determines conditions where image processing of captured image data is degraded in performance due to environmental conditions;

wherein said vision system determines conditions where image processing of captured image data is degraded in performance by determining, via image processing of captured image data, at least one selected from the group consisting of (i) a shadow present in the field of view of said camera within ten frames of captured image data and (ii) a damaged condition of said imager within two minutes of operation of said camera;

wherein said vision system, responsive to the determined condition where image processing of captured image data degrades in performance due to an environmental condition, determines a safe state for that determined condition;

a failsafe algorithm that, responsive to image processing by said image processor of image data captured by said camera and responsive to the determined condition, determines failsafe conditions via processing of image data captured by said camera; and wherein the failsafe algorithm determines if the lens of said camera is at least partially blocked.

13. The vision system of claim 12, wherein the failsafe algorithm determines failsafe conditions without use of special targets disposed in the field of view of said camera.

14. The vision system of claim 12, wherein the failsafe algorithm determines failsafe conditions without any special vehicle maneuvers of the vehicle.

15. The vision system of claim 12, wherein the failsafe algorithm determines if said camera is out of focus.

16. The vision system of claim 12, wherein the failsafe algorithm determines if said camera is out of calibration.

17. A vision system for a vehicle, said vision system comprising:

a camera configured to be disposed at a vehicle so as to have a field of view exterior of the vehicle, the camera comprising a lens and an imager;

an image processor operable to process image data captured by said camera;

wherein, with said camera disposed at the vehicle, said vision system determines conditions where image processing of captured image data is degraded in performance due to environmental conditions;

wherein said vision system determines conditions where image processing of captured image data is degraded in performance by determining, via image processing of captured image data, at least one selected from the group consisting of (i) a shadow present in the field of view of said camera within ten frames of captured image data and (ii) a damaged condition of said imager within two minutes of operation of said camera;

wherein said vision system, responsive to the determined condition where image processing of captured image data degrades in performance due to an environmental condition, determines a safe state for that determined condition;

a failsafe algorithm that, responsive to image processing by said image processor of image data captured by said camera and responsive to the determined condition, determines failsafe conditions via processing of image data captured by said camera;

wherein the failsafe algorithm determines if the lens of said camera is at least partially blocked;

wherein the failsafe algorithm determines if said camera is out of focus; and wherein the failsafe algorithm determines if said camera is out of calibration.

18. The vision system of claim 17, wherein said camera comprises a forward-viewing camera having an exterior field of view forward of the vehicle.

19. The vision system of claim 17, wherein said camera comprises a rearward-viewing camera having an exterior field of view rearward of the vehicle.

20. The vision system of claim 17, wherein said camera comprises a sideward-viewing camera having an exterior field of view sideward of the vehicle.

\* \* \* \* \*